United States Patent [19]
de Sola Mosely

[11] Patent Number: 5,517,262
[45] Date of Patent: May 14, 1996

[54] MOTION PICTURE DRIVE SYSTEM

[76] Inventor: John de Sola Mosely, 2534 Hutton Dr., Beverly Hills, Calif. 90210-1212

[21] Appl. No.: 406,452

[22] Filed: Mar. 20, 1995

Related U.S. Application Data

[63] Continuation-in-part of Ser. No. 29,168, Mar. 10, 1993, abandoned.

[51] Int. Cl.[6] ............................. G03B 41/00; G03B 1/24
[52] U.S. Cl. ........................... 352/80; 352/168; 352/187
[58] Field of Search ................................ 352/79, 80, 129, 352/168, 187; 226/76, 77, 79, 83, 84, 85; 242/209

[56] References Cited

U.S. PATENT DOCUMENTS

| | | | |
|---|---|---|---|
| 1,854,004 | 4/1932 | Tschopp | 352/80 |
| 1,972,555 | 9/1934 | Fear | 352/80 |
| 2,146,767 | 2/1939 | Ross | 352/80 |
| 2,315,703 | 4/1943 | Hirschfeld | 352/80 |
| 2,493,612 | 1/1950 | Blanchet | 352/80 |
| 2,834,249 | 5/1958 | May | 352/80 |
| 3,447,866 | 6/1969 | Heisler | 352/129 |
| 3,507,569 | 4/1970 | Goto | 352/129 |
| 4,900,293 | 2/1990 | McLendon | 352/241 |
| 5,312,304 | 5/1994 | Vetter | 474/160 |

*Primary Examiner*—Michael L. Gellner
*Assistant Examiner*—Eddie C. Lee

[57] ABSTRACT

A changeable sprocket wheel assembly enables the rapid and reliable mounting and demounting of sprocket wheels of different diameters on a film drive shaft by unskilled operators, while assuring that the sprockets are held with high precision. In one arrangement, an inboard sprocket wheel member (50, FIG. 2) receives the inboard portion (55) of a driven shaft in a close sliding fit and is lockable to the shaft, the inboard member having a small diameter land (52) with a ring of sprockets (54) thereon. An outboard sprocket wheel member (60) has the same size land with sprockets thereon, and fits around the outboard shaft portion (65) in a close sliding fit and is detachably fixable to the inboard member to abut it and rotate with it. When a larger diameter sprocket wheel is required, the outboard member (60) is removed and a large sprocket wheel element (70, FIG. 3) is mounted in its place, the large element having two large lands (72, 74) that each have a ring of sprockets (76, 78) thereon, with the large element lying in close sliding fit with the outer shaft portion and being detachably fixable to the inboard member. In another assembly (160, FIG. 10), an inner member (162) receives the drive shaft in a close sliding fit and is rotatably fixed to it, while sprocket wheel members (180, 196) of different sizes each have cylindrical inner surfaces that are closely slidable on the inner member and are mounted to abut it and rotate with it. Detachable fixing of two members is accomplished by a projecting pin portion (100, FIG. 9) that is retained by a spring ring (102).

5 Claims, 3 Drawing Sheets

MOTION PICTURE DRIVE SYSTEM

CROSS REFERENCE TO RELATED APPLICATION

This is a continuation-in-part of U.S. application Ser. No. 08/029,168 filed Mar. 10, 1993, now abandoned.

BACKGROUND OF THE INVENTION

Almost all 35 mm theatrical motion picture film stock is constructed in accordance with ISO (International Standards Organization) and ANSI (American National Standards Institute) standards which call for film stock having two rows of perforations at a nominal pitch of 0.187 inch. The film frames are spaced apart by four perforations and the film is normally run at 18 inches per second or 90 feet per minute. Most commercial theatrical feature films for the U.S. market are projected in accordance with an Academy ratio wherein the projected image has a width of 0.825 inch and a height of 0.446 inch. This height corresponds to 2.385 perforations.

In order to save film, there have been attempts to shoot and project film where each frame at a height of two or three perforations, instead of the century-old standard of four perforations. The two perforation system was rejected on the grounds that the frame had a smaller area than previously, and therefore gave an image of lesser quality. However, the three perforation system has found some use in the television field, and theatrically in Europe. There has recently been a proposal to space the frames at 2.5 perforations.

A film transport for use in projectors, typically includes a sprocket wheel mounted on a drive shaft, the drive shaft being turned 90° in intermittent steps at a rate of twenty-four times per second, by a Geneva mechanism. A sprocket wheel and drive shaft are mounted with high precision, since even small irregularities of film movement can cause noticeable movement of the greatly magnified image projected on a screen.

If films with images spaced at different numbers of perforations are to be used with the same projector or other film transport, then it is necessary for an operator to rapidly replace one sprocket wheel with another. The majority of 35 mm theatrical projectors are presently used to advance film in steps of four perforations each, by 90° of rotation for each step. Typically, they use sixteen tooth sprocket wheels having lands (where the film side is supported) of a diameter of approximately 0.950 inch. To advance film in steps of three perforations each, a twelve tooth sprocket wheel is required, which has lands of a diameter of about 0.712 inch. To advance film in steps of 2.5 perforations, a ten tooth sprocket wheel is required, which has a land diameter of about 0.594 inch. In one example, two film formats are to be projected, the first requiring the film to be advanced in steps of four perforations and the other requiring the film to be advanced in steps of 2.5 perforations. It would be desirable if a changeable sprocket wheel assembly were available to enable different size sprocket wheels to be established on a drive shaft, where the changeover was simple and obvious and performable without tools by unskilled operators, and if each sprocket wheel was mounted with high precision to assure accurate film movement and avoid wear. Such operators may, for example, be paid close to a minimum wage and sell refreshments when not operating a projector.

SUMMARY OF THE INVENTION

In accordance with one embodiment of the present invention, a changeable sprocket wheel assembly is provided, which enables sprocket wheel size to be changed in a simple manner and without special tools or even any tools, while assuring that each sprocket wheel is mounted with high precision. One system includes an inboard sprocket wheel member that is permanently mounted on an inboard portion of the drive shaft and which forms one end of a small sprocket wheel. An outboard sprocket wheel member that forms the other side of the small sprocket wheel, mounts in a close sliding fit on the outboard portion of the drive shaft and is coupled to the inboard member to abut it and rotate with it. The system also includes a large sprocket wheel member or element that has two rings of sprockets projecting from large diameter lands. The large element is closely slidably mounted on the drive shaft outer portion and is coupled to the inboard member to abut it and rotate with it.

A coupling that assures that two members remain in abutment and rotate together, includes a pin portion that projects axially from a first member such as the outboard member. The inboard member has an axially-extending pin-receiving passage that receives the projecting portion of the pin. The inboard member also has an annular groove that receives a spring ring. The spring ring abuts a surface near the end of the pin to resist axially outward movement of the outboard member, thereby keeping it in abutment with the inboard member. The pin portion received in the passage of the inboard member, also assures that the members rotate together. The outboard member can be removed by pulling it outwardly with a moderately high force, that is resiliently resisted by the spring ring.

Another changeable sprocket wheel assembly includes a radially inner member that has a precision cylindrical inner surface that receives the drive shaft in a close sliding fit and that is fixed to the drive shaft. The inner member has a precision cylindrical outer surface. Sprocket wheels of different sizes can be mounted on the inner member by a precision cylindrical inner surface of each sprocket wheel receiving the inner member in a close sliding fit.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
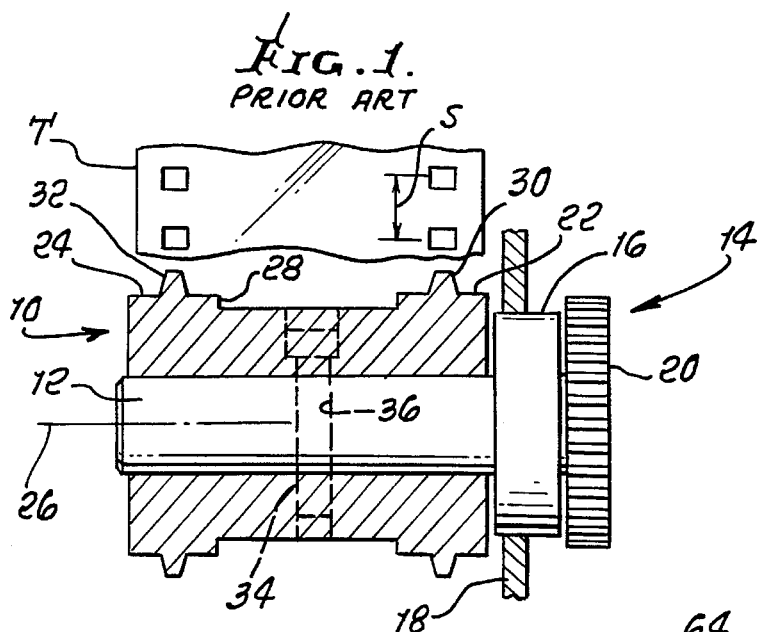
FIG. 1 is a sectional side view of a sprocket wheel of the prior art, shown mounted on a drive shaft of a theater motion picture projector.

FIG. 1 shows a prior art sprocket wheel 10 mounted on a driven shaft 12 of a commercial theater motion picture projector 14. The shaft 12 is rotatably mounted through a bearing 16 onto a projector frame 18. The shaft is rotated through a gear 20 on the driven shaft. The particular sprocket wheel 10 has a pair of cylindrical inward and outward lands 22, 24 concentric with the axis of rotation 26 of the shaft, and has a recess 28 between the lands (a recess between lands is not always necessary). Each land carries a ring of sprockets 30, 32, with the radially inward ends of the sprockets (where they intersect the land surface) being circumferentially spaced by 0.187 inch to match the perforation spacing S (centered-to-center) of standard film stock T. The sprocket wheel is held in position on the shaft by screw 34 that projects through a cross hole 36 (which may or may not be threaded) in the shaft.

It would be possible to substitute the sprocket wheel 10 for a similar one but of smaller diameter at its lands. However, most theaters presently use low skilled workers who may sell refreshments between change overs. Such a worker may tighten the screw too tightly so the next person is unable to loosen it. Also, such person may drop a screw or Allen wrench into the projector and damage it. It is highly desirable that the sprocket wheel be changeable in a "fool proof" manner by low skilled or unskilled workers.

Figure 2:
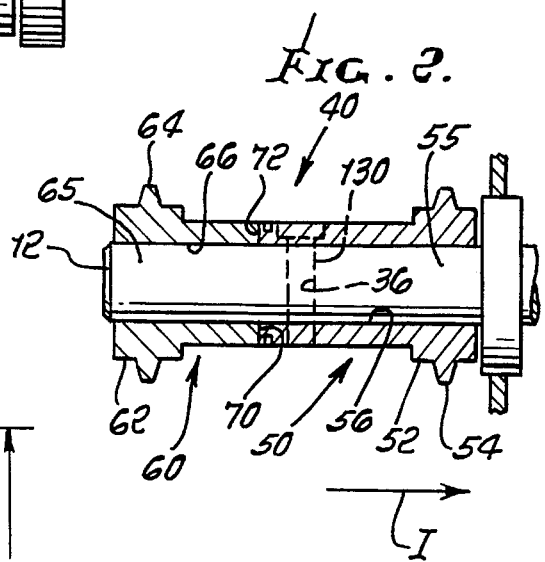
FIG. 2 is a sectional side view of a changeable sprocket wheel assembly of one embodiment of the present invention, shown in a small sprocket wheel configuration.

FIG. 2 illustrates a changeable sprocket wheel assembly 40 of the present invention, which minimizes the possibility of damage by unskilled workers while enhancing the likelihood of proper installation. The assembly includes an inboard sprocket wheel member 50 which is substantially permanently fixed to the drive shaft 12, as by a screw 130 that projects through a hole 36 in the shaft. The inboard member has a cylindrical land 52 with a ring of sprockets 54 thereon, with the radially inner ends of the sprockets circumferentially spaced by the standard spacing of 0.187 inch. A technician accurately installs the inboard member 50 on an inboard portion 55 of the drive shaft with the shaft-receiving hole 56 being precise and closely receiving the shaft in a close sliding fit (the shaft-receiving hole is larger in .diameter by no more than 3 thousandths inch, and usually much less). For example, where the shaft outside diameter is 0.2455 inch, the inside diameter of the hole 56 may be 0.2500 inch, or five ten-thousandths inch larger. The ring of sprockets 54 is assumed to include ten sprockets, for projecting a motion picture film whose frames are spaced apart by 2.5 perforations.

In order to project with the 2.5 perforation spacing, a low skilled or unskilled operator installs an outboard or small sprocket wheel member 60 as shown in FIG. 2. The outboard member 60 has a land 62 and ring of sprockets 64 matching those 52, 54 of the inboard member i.e. inner element 50. The outboard member has a precision shaft-receiving hole 66 which is also constructed to have a close sliding fit with an outboard portion 65 of the shaft 12, as with a difference in diameters such as five ten-thousandths inch. The outboard member has an inboard surface 70 (that faces in the inward direction I) that abuts a corresponding outboard surface 72 of the inboard member, to prevent axial movement of the outboard member. Also, the outboard member is fixed in rotation to the inboard member 50.

Figure 3:
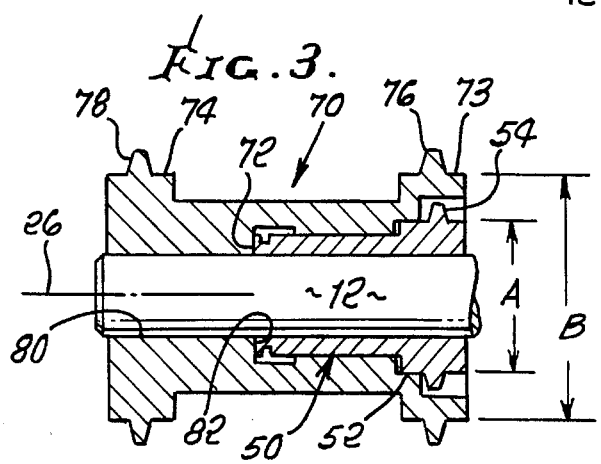
FIG. 3 is a sectional view of the system of FIG. 2, shown in a large sprocket wheel configuration.

FIG. 3 snows a large sprocket element 70 mounted on the drive shaft 12, with a pair of lands 72, 74 of large diameter B which is of larger diameter than the land of diameter A of the inboard sprocket wheel member 50. The large sprocket element has two rows of sprockets 76, 78 with perhaps sixteen sprockets, as compared to perhaps only ten sprockets at the ring 54. The large sprocket element has a precision cylindrical hole 80 which is designed for a close sliding fit over the shaft 12, to locate the lands 72, 74 precisely concentric with the axis of rotation 26 of the shaft. The large sprocket element 70 has an inboard end 82 that abuts the outboard end 72 of the inboard member 50 and that is rotatably coupled to the inboard member 50.

Figure 6:
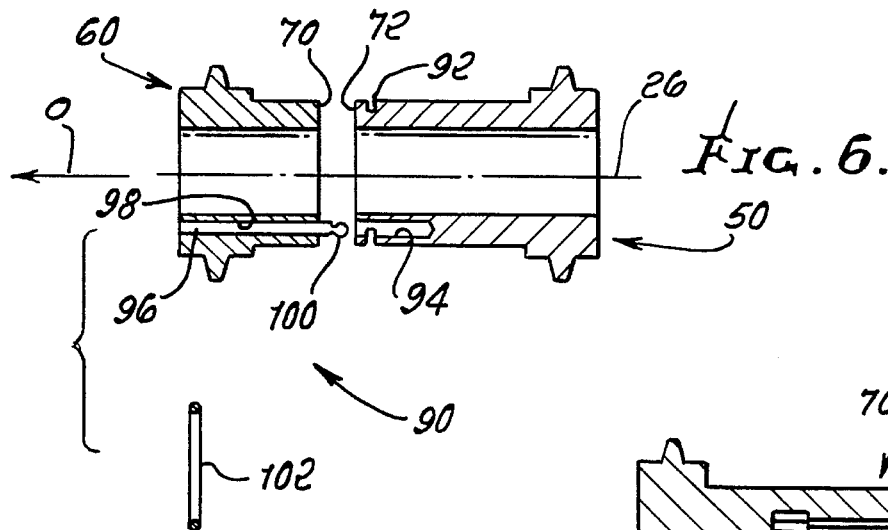
FIG. 6 is a view similar to that of FIG. 4, but taken on line 6—6 of FIG. 5, and also showing the spring ring.

FIG. 6 shows a readily detachable connection arrangement 90 which rotatably connects the inboard and outboard members 50, 60, and which holds the members so their adjacent surfaces 70, 72 are held in firm abutment. The inboard member 50 has an annular groove 92 that is largely concentric with the axis 26. The member 50 also has a pin receiving passage 94 that intersects the groove. The outboard member 60 carries a pin 96 with a projecting pin portion 100 that is designed to be received in the passage 94 of member 50. The pin 96 is preferably a separate part that is press-fitted into a hole 98 in the outboard member. A spring ring shown separately at 102, normally lies in the groove 92 and engages the projecting pin portion 100, to prevent withdrawal of the pin portion 100 and the outboard member in the outboard direction O.

Figure 5:
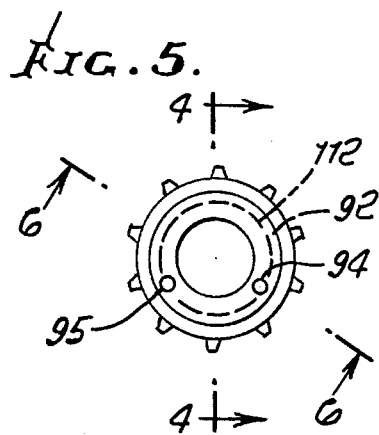
FIG. 5 is a front or inward elevation view of the inboard sprocket wheel member of FIG. 4, as taken on line 5—5 thereof.
Figure 4:
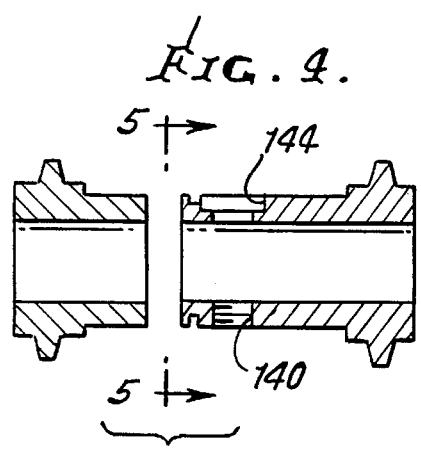
FIG. 4 is an exploded side sectional view of the parts of the system of FIG. 2, and shown as taken on line 4—4 of FIG. 5.
Figure 9:
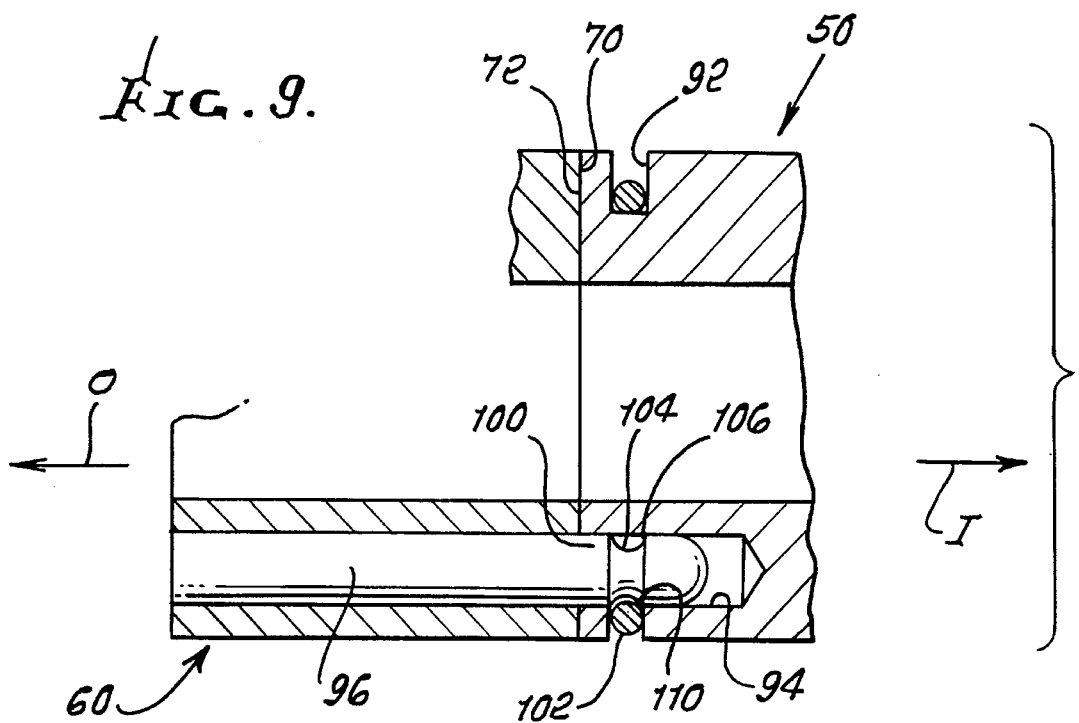
FIG. 9 is an enlarged view of a portion of the assembly of FIG. 6, in its fully assembled configuration.

As shown in FIG. 9, the projecting pin portion 100 has a recess 104 with a shoulder or inclined wall 106 that faces with an outward directional component O. The inclined wall 106 is positioned, with respect to the groove 92, so that an inward location 110 of the spring ring 102 will engage the inclined wall 106 when the outboard member 60 is pushed so that the surfaces 70, 72 abut each other. The spring ring 102 tends to compress to a smaller diameter, and the inward force applied by its location 110 tends to press the pin inwardly, in the direction I, and thereby press the inboard member 60 inwardly. The pin 96 therefore serves to keep the outboard member 60 in a fixed axial position with respect to the inboard member 50 while rotatably connecting them (by the pin portion 100 being closely received in the passage 94). As shown in FIG. 5, applicant provides two pin-receiving passages 94, 95, for receiving two corresponding pins. FIG. 5 also shows that the bottom 112 of the groove 92 that receives the spring ring, lies slightly radially outward of the middle of the passages 94, 95.

Figure 7:
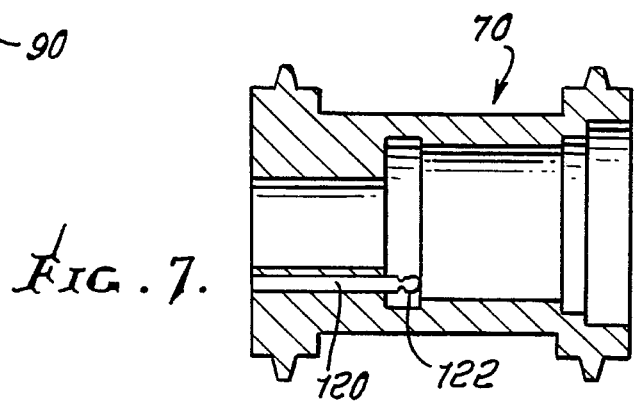
FIG. 7 is a sectional view of the large sprocket wheel element of FIG. 3, as taken on a different sectional view thereof.

As shown in FIG. 7, the large sprocket member or element 70 includes a pin 120 with a projecting pin portion 122, of the same construction as the pin end portion 100 of FIGS. 6 and 9. Accordingly, the large sprocket element 70 can be installed, in place of the inboard member 60, by merely sliding the large element 70 along the shaft 12 until the projecting pin portions 122 fully enter the corresponding passages 94 (FIG. 6) of the inboard member 50.

Figure 8:
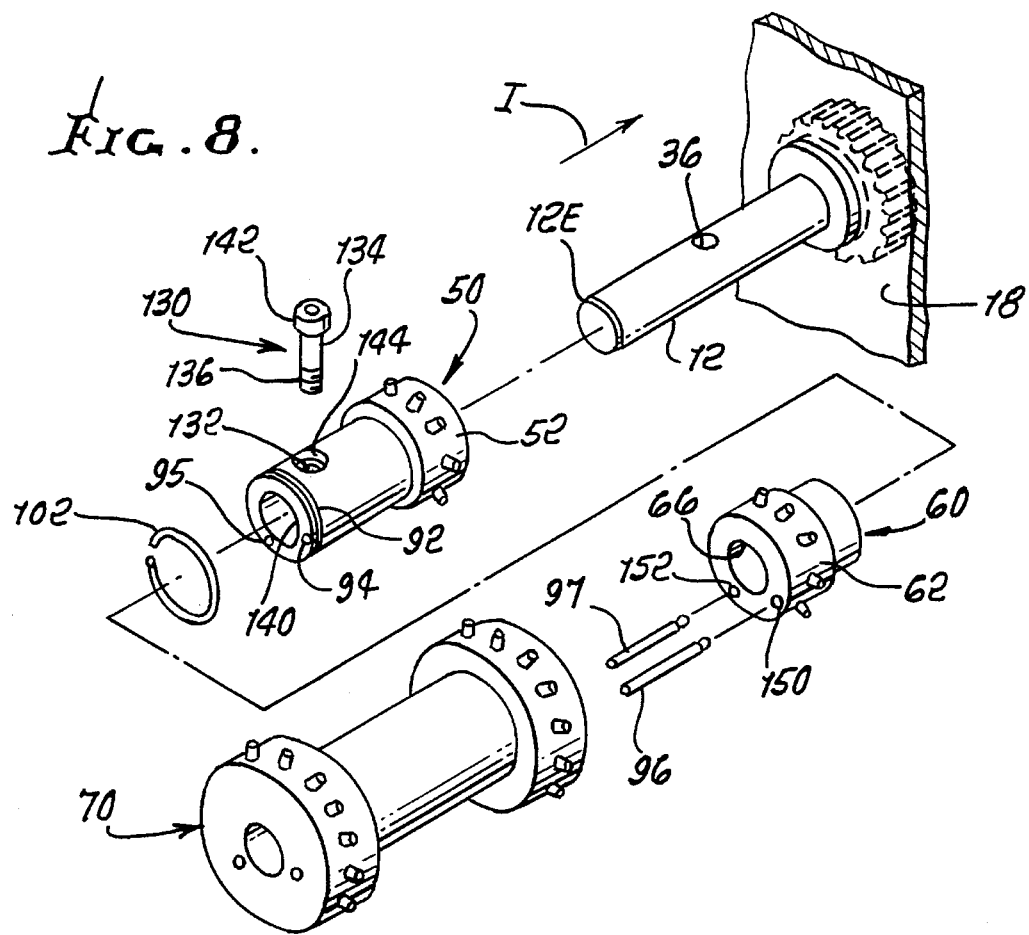
FIG. 8 is an exploded isometric view of the sprocket wheel assembly showing the parts of FIGS. 2–7.

A skilled technician replaces the prior art sprocket by removing it and installing the inboard sprocket wheel member 50 of FIG. 2. A technician inserts a screw 130 (FIG. 8) through a hole 132 in inboard member 50 and through the hole 36 in the shaft. Where the shaft hole 36 is threaded, the screw 130 will be threaded. Where the shaft hole 36 is not threaded, the screw 130 is of the construction illustrated, with a smooth part 134 that is very closely received in the shaft hole 36, and with a threaded end 136 that is received in a threaded hole 140 in the member 50. The head 142 of the screw will lie in a recess 144. The spring ring 102 will be installed in the groove 92. When an unskilled operator must set up a sprocket wheel with small diameter lands, which are those of the members 50, 60, the operator aligns the shaft-receiving hole 66 of outboard member 60 with the shaft end 12E and slides the member 60 inwardly, in direction I. The operator has been told that the pins 96, 97 (which will be already press-fit into the passages 150, 152 of the member 60) must be aligned with the holes 94, 95. The operator senses when the projecting pin parts are aligned with the passages 94, 95 of the inward member, because the inward pin ends are tapered. The operator then presses inwardly on the member 60, with a force such as five to ten pounds. The operator will feel that the pins have snapped into position, and will know that the outboard member has been properly installed. In many cases, it is possible to reverse the arrangement by mounting the pin on the fixed inner member and the spring ring on the detachable outer member.

When the operator is informed that the large sprocket element 70 is to be installed, the operator grabs the member 60 and pulls it outwardly, the member pulling free with a force of about five to ten pounds. The operator then pushes the larger element 70 over the shaft and continues pushing it until he/she senses a snap. At that time, the projecting pin portions 122 (FIG. 7) of the larger device will have snapped into the recesses 94, 95 of the inboard member 50.

Figure 10:
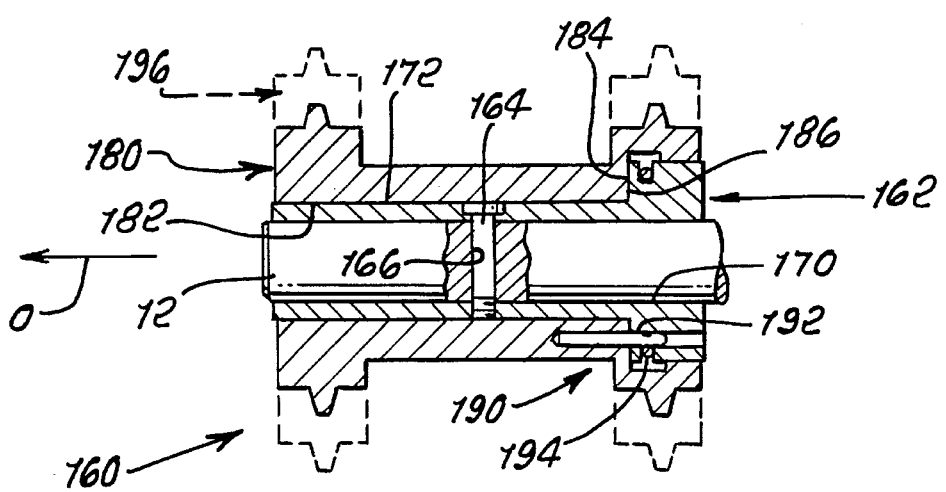
FIG. 10 is a sectional side view of a changeable sprocket wheel assembly constructed in accordance with another embodiment of the invention, with a large sprocket wheel being shown in phantom lines.

FIG. 10 illustrates another changeable sprocket wheel assembly 160 which mounts on the drive shaft 12. The assembly includes an inner member or element 162 that is fixed to the shaft 12, as by a screw 164 that passes through a hole 166 in the shaft. The inner element has a precision hole 170 that lies in a close sliding fit with the outside of the shaft, as where the hole 170 is larger by five ten-thousandths inch than the outside of the shaft 12. The inner element has a cylindrical outer surface 172 which is precisely concentric with the hole or inner surface 170. A small sprocket wheel member 180 is slipped over the inner element, with a precision inner surface 182 lying in a close sliding fit with the outer surface 172 of the inner element 162. The inner element has an outboard surface 184 that abuts an inboard surface 186 of the small sprocket wheel member 180. A connection arrangement 190 that includes a pin projecting portion 192 and a spring ring 194, of the same construction as shown in FIGS. 6 and 9, holds the small member 180 against axial movement while assuring that the member 180 and element 162 rotate together. The small member 180 can be removed by merely pulling it in the outward direction O with a moderate force such as ten pounds. Then, a large sprocket wheel member 196 can be installed the same way. It may be noted that because of accumulated gaps at the surfaces 170, 182, this arrangement may be less precise than that of FIGS. 1–9.

Thus, the invention provides changeable sprocket wheel assemblies and readily detached connector arrangements that are especially useful therewith. In one sprocket wheel assembly, an inboard member surrounds only an inboard portion of the driven shaft, and each of two or more different members or elements each is directly engaged with an outboard portion of the driven shaft. In a second assembly, an inner member has a precision cylindrical inner surface in close sliding engagement with the drive shaft and a precision concentric outer surface. In the second assembly, the sprocket wheel members have precision cylindrical inner surfaces that engage the outer surface of the inner member. A readily detachable connection arrangement includes a pin-receiving passage on the first, permanently installed member, which receives a pin portion that projects from a second, removable, member. The projecting pin portion has a recess with an inclined wall. The first member has a groove that intersects the passage and that holds a spring ring that presses against the inclined surface of the pin portion to retain the pin while allowing it to be forcefully pulled out.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A changeable sprocket wheel assembly for mounting on a driven shaft of a film transport which moves film that has first and second sides and first and second rows of sprocket holes at said sides, at different film speeds for a given speed of rotation of said shaft, comprising:

an inboard sprocket wheel member that has a hole with an axis, and that is constructed to receive said driven shaft in a close sliding fit, said inboard member being lockable to said shaft to run therewith and not shift axially thereon, said inboard member having a first land extending cylindrically about said axis at a first diameter for supporting said first film side and having a ring of spaced first sprockets for engaging said first row of sprocket holes;

an outboard sprocket wheel member that has a second land extending cylindrically about said axis at said first diameter for supporting said second film side and having a ring of spaced second sprockets for engaging said second row of sprocket holes, said outboard member being fixable to said inboard member so they both turn together about said axis and do not shift axially relative to each other;

and a large sprocket wheel element that has first and second land parts extending cylindrically about said axis at a second diameter which is greater than said first diameter and that has a ring of spaced sprockets at each of said land parts for supporting both sides of said film and engaging the holes thereat, said large sprocket wheel element being fixable to said inboard member when said outboard member is not present, so that said large element and said inboard member turn together about said axis and do not shift axially relative to each other, with one of said land parts of said large element directly surrounding said first land of said inboard member.

2. The assembly defined in claim 1 wherein:

said inboard member is constructed to surround only an inboard portion of said shaft but not an outboard portion of said shaft;

said outboard member and said large element each have a shaft-receiving hole that is constructed to receive said outboard portion of said shaft in a close sliding fit.

3. The assembly defined in claim 1 including:

a readily detachable connection arrangement for coupling said inboard member to said outboard member, including a pin having a projecting pin portion, and a spring ring;

said inboard member having an annular groove that is concentric with said axis, and said inboard member having a pin-receiving passage that extends parallel to said axis and that intersects said groove;

said outboard member carrying said pin and said projecting pin portion;

said spring ring lies in said groove, and said projecting pin portion lies in said pin-receiving passage, said pin having a pin recess, and wherein said spring ring lies in said pin recess to resist pullout of said pin.

4. A changeable sprocket wheel assembly for mounting on a driven shaft of a film transport where the shaft has an axis, comprising:

an inner element that has a hole with a precision cylindrical inner surface that closely slidably fits on said shaft and that has a precision cylindrical outer surface that is precisely concentric with said inner surface, said inner element being fixable to said shaft;

small and large sprocket wheel members, the small member and said inner element having a first pair of film engaging lands and having a ring of sprockets spaced about each of said lands, the large member having a second pair of film engaging lands and also having a ring of sprockets spaced about each of said lands of said second pair, the lands of said second pair spaced further from said axis than said lands of said first pair, the number of sprockets spaced about each of said lands of said second pair exceeding the number of sprockets spaced about each of said lands of said first pair, each of said members having a hole with a precision cylindrical inner surface that closely slidably fits on said shaft, and each of said members having an inwardly-facing abutting surface for abutting said inner element and being fixable against axial and rotational movement relative to said inner element.

5. In a changeable sprocket wheel assembly for mounting on a driver shaft of a film transport that has a shaft axis, which includes one member that is fixed to the shaft and another member that can be installed by sliding it inwardly until surfaces on said members abut, the improvement of a readily detachable connection arrangement for keeping said surfaces in abutment while assuring that said members turn together with said shaft, comprising:

walls forming an annular groove in a first of said members, and walls forming a pin-receiving passage extending parallel to said axis in said first of said members with said passage intersecting said groove;

a spring ring lying in said groove;

a pin having a pin portion extending from said second member to slidably fit into said passage, said pin portion having a recess forming an inclined surface, so the spring ring can press on said inclined surface to releasably retain said pin and keep said surfaces in abutment.

* * * * *